United States Patent
Hsu

(10) Patent No.: US 6,552,458 B1
(45) Date of Patent: Apr. 22, 2003

(54) LOCATING STRUCTURE FOR SILICON SHEET OF MOTOR LOCATOR

(75) Inventor: Ming-Chuan Hsu, Kaohsiung (TW)

(73) Assignee: Sam Lam Tech. Co., LTD, Taichung (TW)

( * ) Notice: Subject to any disclaimer, the term of this patent is extended or adjusted under 35 U.S.C. 154(b) by 0 days.

(21) Appl. No.: 10/197,439

(22) Filed: Jul. 18, 2002

(51) Int. Cl.⁷ .............. H02K 5/00; H02K 7/00; H02K 11/00; H02K 15/00
(52) U.S. Cl. .............. 310/91; 310/68 B; 310/42
(58) Field of Search .............. 310/91, 68 B, 310/68 R, 67 R, 66, 42

(56) References Cited

U.S. PATENT DOCUMENTS

| | | | | |
|---|---|---|---|---|
| 4,547,714 A | * | 10/1985 | Muller | 310/68 R |
| 4,554,491 A | * | 11/1985 | Plunkett | 310/68 R |
| 4,636,671 A | * | 1/1987 | Terada | 310/68 R |
| 4,717,850 A | * | 1/1988 | Muller | 310/67 R |
| 5,469,005 A | * | 11/1995 | Asama et al. | 310/68 B |
| 5,652,470 A | * | 7/1997 | von der Heide et al. | 310/67 R |
| 5,831,359 A | * | 11/1998 | Jeske | 310/68 B |
| 5,973,428 A | * | 10/1999 | Zakrocki et al. | 310/91 |
| 6,097,120 A | * | 8/2000 | Horng | 310/68 B |
| 6,097,129 A | * | 8/2000 | Furtwangler et al. | 310/67 R |
| 6,242,826 B1 | * | 6/2001 | Saito et al. | 310/67 R |
| 6,462,443 B2 | * | 10/2002 | Horng | 310/68 B |
| 6,476,526 B1 | * | 11/2002 | Hsieh | 310/68 B |

* cited by examiner

Primary Examiner—Nestor Ramirez
Assistant Examiner—Guillermo Perez
(74) Attorney, Agent, or Firm—Rosenberg, Klein & Lee

(57) ABSTRACT

A locating structure for a silicon sheet of a motor locator, including a base board, a locator and a rotor. The base board is formed with a central fixing hole in which a bush of the locator is fixedly fitted. A sensing switch is disposed on the base board and has a chip sensing point. A silicon sheet is inlaid in a face of the locator adjacent to the base board. The silicon sheet has several radially projecting pole sections. In addition, the silicon sheet has a group of integrally projecting locating blocks radially opposite to each other. The base board is formed with locating holes respectively corresponding to the locating blocks. When a border of one pole section of the silicon sheet is aimed at the chip sensing point of the sensing switch, the locating blocks are inserted in the locating holes to truly locate the silicon sheet.

1 Claim, 4 Drawing Sheets

LOCATING STRUCTURE FOR SILICON SHEET OF MOTOR LOCATOR

BACKGROUND OF THE INVENTION

A present invention is related to an improved locating structure for a silicon sheet of a motor locator. The locating structure is able to truly locate the silicon sheet and aim the silicon sheet at a chip sensing point of a sensing switch.

FIGS. 4 and 5 show a conventional wiperless DC motor. The motor includes a base board 81 formed with a central fixing hole 82. A bush 86 of a locator 85 is fixedly fitted in the fixing hole 82. A silicon sheet 84 is inlaid in each of the top and bottom faces of the locator 85. Each silicon sheet 84 has several pole sections 841. The locator 85 has several downward extending fixing rods 851. The base board 81 has a sensing switch 83 having a chip sensing point 831. The base board 81 has several fixing holes 811 respectively corresponding to the fixing rods 851. The fixing rods 851 are inserted in the fixing holes 811 for locating the locator 85. When located, the edge of one of the pole sections 841 of the silicon sheet 84 is aimed at the chip sensing point 831 of the sensing switch 83. The shaft 871 of a rotor 87 is disposed in the bush 86 of the locator 85. The rotor 87 has an annular permanent magnet 88 fitted around the locator 85. The coil in the locator 85 is controlled by the sensing switch 83 to create magnetic force of different polarities at the pole sections 841 of the silicon sheet 84. Accordingly, the permanent magnet 88 is driven to rotate the rotor 87 for driving a fan (not shown).

In the above structure, the fixing rods 851 are integrally formed in integral injection molding of the locator 85. The cross-section of the fixing rod 851 has small area so that when demolded, the fixing rods 851 tend to bend and deform. As a result, when using the fixing rods 851 to fix the locator 85, the fixing rods 851 are often deflected so that the pole sections 841 of the silicon sheet 84 can be hardly accurately aimed at the chip sensing point 831 of the sensing switch 83. In more serious case, the rotor 87 may be unable to rotate.

Moreover, the fixing rods 851 are integrally formed with the locator 85. Therefore, when the fixing rods 851 are inserted in the fixing holes 811, it is the locator 85 which is directly located, not the silicon sheet 84. In other words, the silicon sheet 84 is indirectly located by the fixing rods 851. Such locating measure tends to cause error of position where the silicon sheet 84 is inlaid in the locator 85. As a result, the silicon sheet 84 can be hardly truly located. In serious case, the rotor 87 may be also unable to rotate.

The sensing switch 83 through the chip sensing point 831 senses the variation of magnetic force of the pole sections 841 of the silicon sheet 84 so as to control turning on/off of the coil in the locator 85. Accordingly, the pole sections 841 of the silicon sheet 84 can create magnetic force of different polarities to drive the rotor 87 for driving the fan. Therefore, it is critical to accurately aim the pole sections of the silicon sheet at the chip sensing point of the sensing switch.

SUMMARY OF THE INVENTION

It is therefore a primary object of the present invention to provide an improved locating structure for silicon sheet of motor locator. The silicon sheet has a group of integrally projecting locating blocks radially opposite to each other. The base board is formed with locating holes respectively corresponding to the locating blocks. When a border of one pole section of the silicon sheet is aimed at the chip sensing point of the sensing switch, the locating blocks are inserted in the locating holes to truly locate the silicon sheet.

The present invention can be best understood through the following description and accompanying drawings wherein:

DETAILED DESCRIPTION OF THE PREFERRED EMBODIMENT

Figure 1:
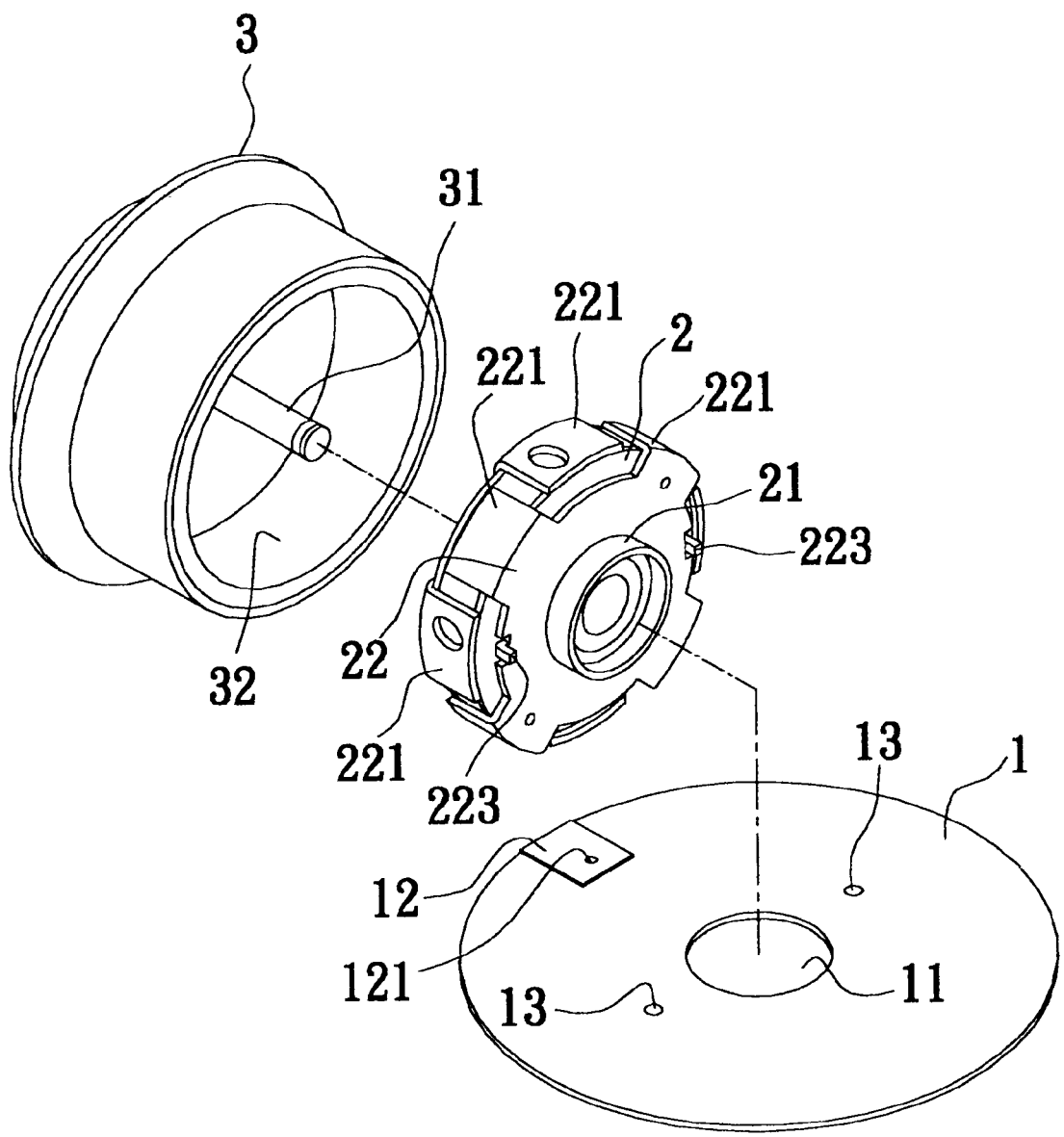
FIG. 1 is a perspective exploded view of the present invention.
Figure 2:
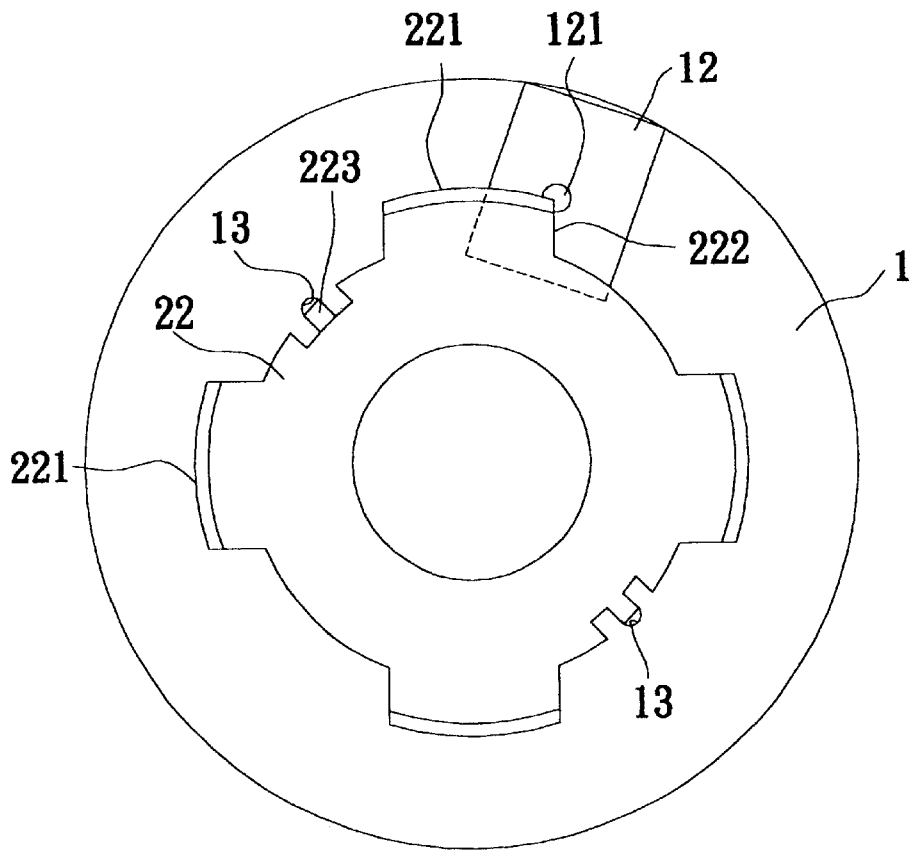
FIG. 2 is a plane view showing the position where the silicon sheet of the present invention is located on the base board.
Figure 3:
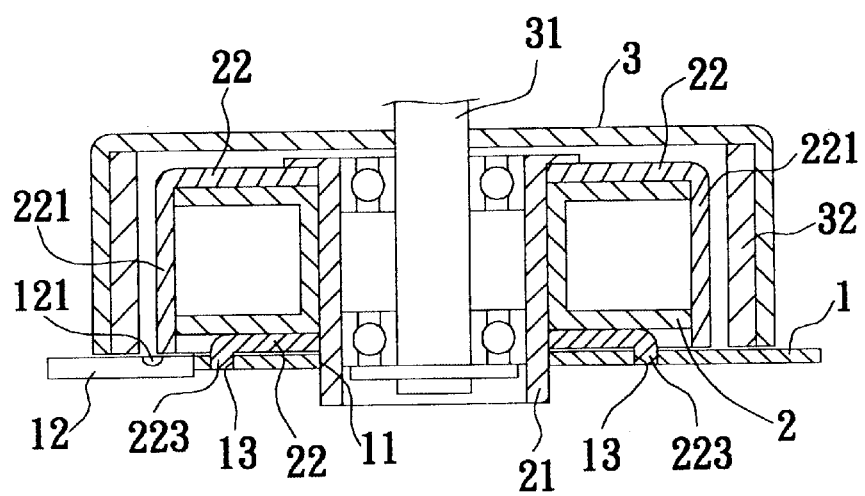
FIG. 3 is a sectional assembled view of the present invention.
Figure 4:
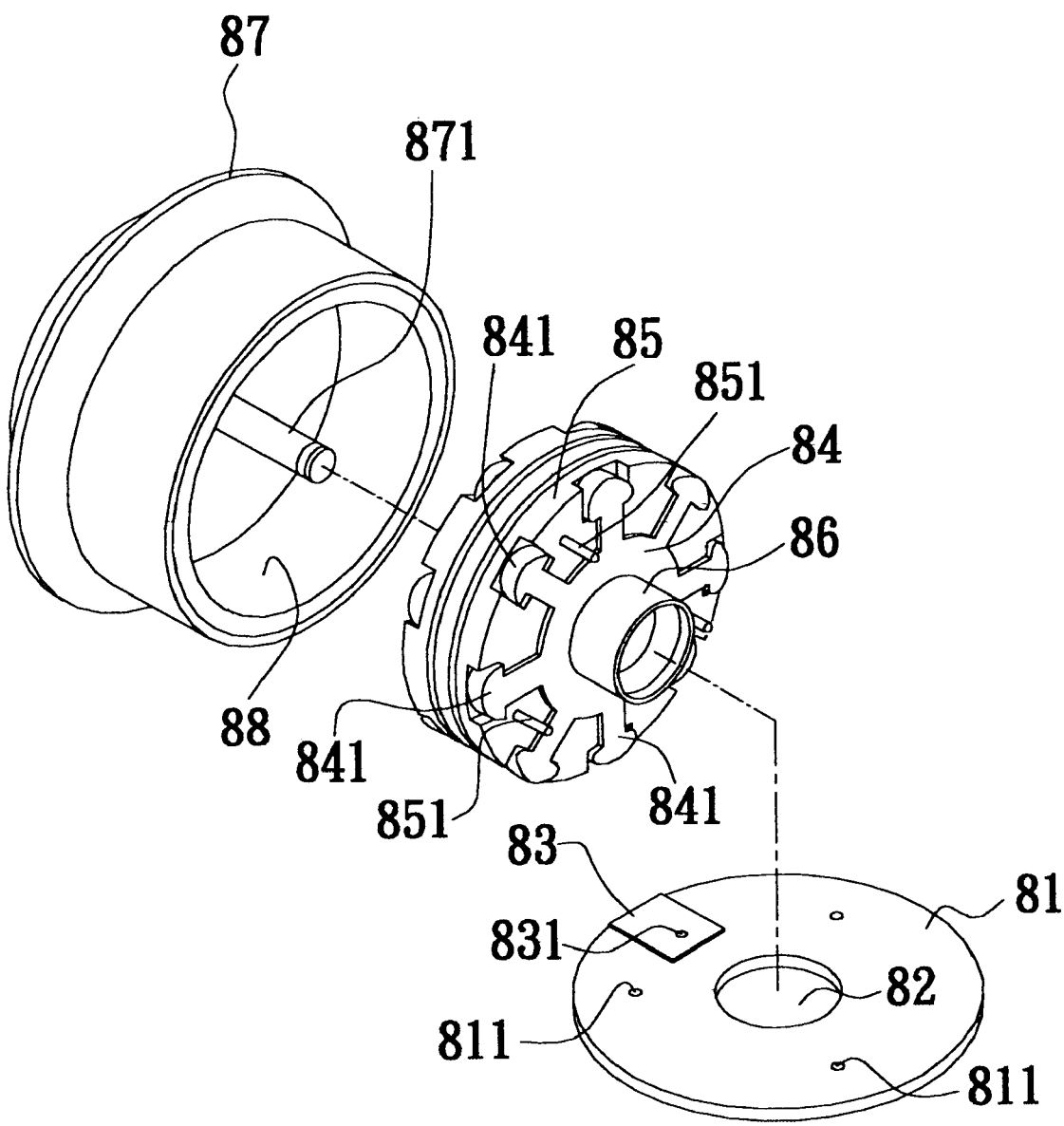
FIG. 4 is a perspective exploded view of a conventional wiperfree DC motor.
Figure 5:
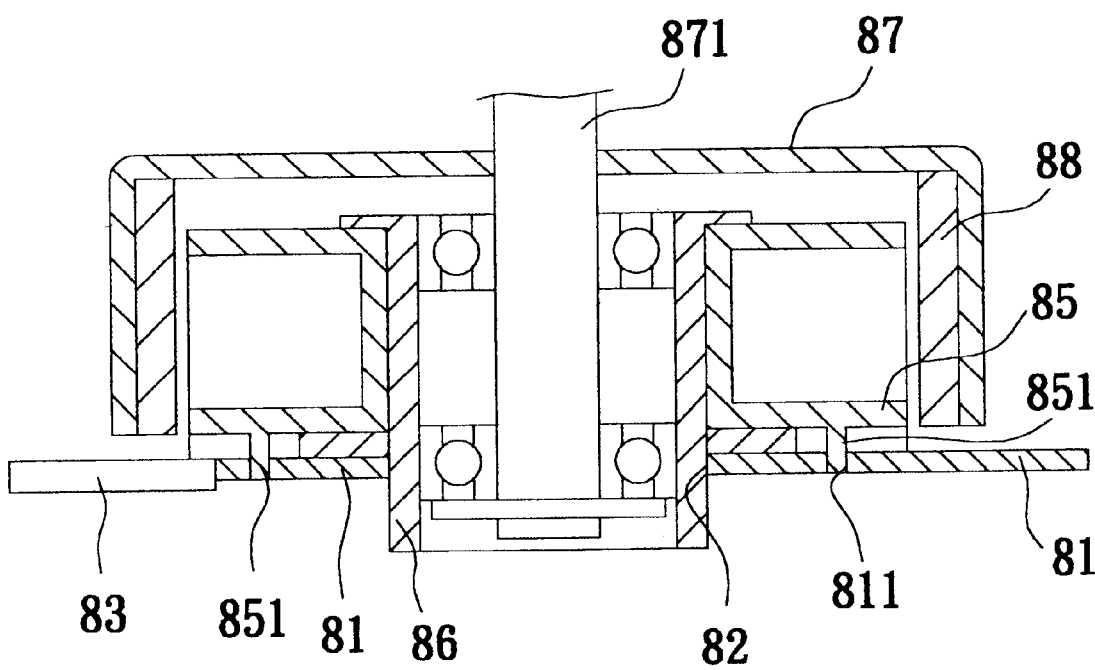
FIG. 5 is a sectional assembled view of the conventional wiperfree DC motor.

Please refer to FIGS. 1 to 3. The locating structure for silicon sheet of motor locator of the present invention includes a base board 1, a locator 2 and a rotor 3.

The base board 1 is formed with a central fixing hole 11. A sensing switch 12 is disposed on the base board 1 and has a chip sensing point 121.

The locator 2 has a bush 21 fixedly fitted in the fixing hole 11 of the base board 1. A silicon sheet 22 is inlaid in each of the top and bottom faces of the locator 2. Each silicon sheet 22 has several radially projecting pole sections 221. A portion of outer edge of each pole section 221 most proximal to an adjacent pole section 221 is defined as a border 222. The silicon sheet 22 has a group of integrally projecting locating blocks 223 radially opposite to each other. The base board 1 is formed with locating holes 13 respectively corresponding to the locating blocks 223 of the silicon sheet 22. When the border 222 of one pole section 221 of the silicon sheet 22 is aimed at the chip sensing point 121 of the sensing switch 12, the locating blocks 223 are inserted in the locating holes 13 to locate the silicon sheet 22.

The rotor 3 has a central shaft 31 inserted in the bush 21 of the locator 2. The rotor 3 has an annular permanent magnet 32 fitted around the locator 2.

The two locating blocks 223 of the silicon sheet 22 are integrally bent from the silicon sheet 22 and are radially opposite to each other. Therefore, the locating blocks 223 are not subject to deformation as the fixing rods of the prior art. Moreover, the base board 1 is formed with locating holes 13 respectively corresponding to the locating blocks 223. Therefore, the silicon sheet 22 can be directly located via the locating blocks 223. Accordingly, the border 222 of the pole section 221 of the silicon sheet 22 can be accurately aimed at the chip sensing point 121 of the sensing switch 12 as shown in FIG. 2. Therefore, the chip sensing point 121 of the sensing switch 12 can truly sense the variation of magnetic force and the sensing switch 12 can accurately control turning on/off of the coil in the locator 2. Accordingly, the motor can stably operate.

The above embodiment is only used to illustrate the present invention, not intended to limit the scope thereof. Many modifications of the above embodiment can be made without departing from the spirit of the present invention.

What is claimed is:

1. A locating structure for a silicon sheet of a motor locator, comprising:

a base board formed with a central fixing hole, a sensing switch being disposed on the base board and having a chip sensing point;

a locator having a bush fixedly fitted in the fixing hole of the base board, at least one silicon sheet being inlaid in a face of the locator adjacent to the base board, the silicon sheet having several radially projecting pole sections, a portion of outer edge of each pole section most proximal to an adjacent pole section being defined as a border; and a rotor having a central shaft inserted in the bush of the locator, the rotor having an annular permanent magnet fitted around the locator, said locating structure being characterized in that the silicon sheet integrally has a group of locating blocks radially opposite to each other, the base board being formed with locating holes respectively corresponding to the locating blocks of the silicon sheet, whereby when the border of one pole section of the silicon sheet is aimed at the chip sensing point of the sensing switch, the locating blocks are inserted in the locating holes to locate the silicon sheet.

* * * * *